US012779721B2

(12) United States Patent
Kagramanyan

(10) Patent No.: US 12,779,721 B2
(45) Date of Patent: Nov. 3, 2026

(54) SHEET CUTTER

(71) Applicant: Norik Kagramanyan, Pacoima, CA (US)

(72) Inventor: Norik Kagramanyan, Pacoima, CA (US)

(*) Notice: Subject to any disclaimer, the term of this patent is extended or adjusted under 35 U.S.C. 154(b) by 119 days.

(21) Appl. No.: 18/299,596

(22) Filed: Apr. 12, 2023

(65) Prior Publication Data

US 2023/0249372 A1 Aug. 10, 2023

Related U.S. Application Data

(63) Continuation-in-part of application No. 16/762,109, filed as application No. PCT/US2018/059635 on Nov. 7, 2018, now abandoned.

(60) Provisional application No. 62/583,464, filed on Nov. 8, 2017.

(51) Int. Cl.
*B26D 1/30* (2006.01)
*B26D 5/10* (2006.01)

(52) U.S. Cl.
CPC ............... *B26D 1/305* (2013.01); *B26D 5/10* (2013.01)

(58) Field of Classification Search
CPC .................................. B26D 5/10; B26D 1/305
See application file for complete search history.

(56) References Cited

U.S. PATENT DOCUMENTS 1,276,256 A * 8/1918 O'Reardon ............... B25B 7/02 30/349
1,373,555 A * 4/1921 Graham .................... B25B 7/02 30/349
1,620,225 A 3/1927 Morgan
1,632,525 A * 6/1927 Wilkes .................... B26B 13/04 30/260
1,822,050 A 9/1931 Luedtke
2,045,187 A * 6/1936 Hurd ...................... A01D 75/08 56/250
2,079,879 A * 5/1937 Schluter ................. A01B 1/222 403/258
2,232,315 A * 2/1941 Craig .............................. 30/236
2,732,620 A * 1/1956 Schluter ................ B26B 25/005 D7/693

(Continued)

FOREIGN PATENT DOCUMENTS

CN 106378798 A 2/2017
DE 202004007502 U1 10/2004

OTHER PUBLICATIONS

International Search Report for PCT Application No. PCT/US2024/024152, dated Sep. 9, 2024, 10 pages.

(Continued)

*Primary Examiner* — Liang Dong

(74) *Attorney, Agent, or Firm* — LOZA & LOZA, LLP; Michael I. Angert

(57) ABSTRACT

Aspects of the disclosure relate to an apparatus. In some aspects, the apparatus includes a first arm and a second arm pivotally coupled to the first arm at a hinge. The apparatus further includes a first blade coupled to the first arm and a second blade coupled to the second arm. The first arm and second arm are spaced apart to provide a cavity for receiving sheet material to be cut by the first and second blades. Other aspects, embodiments, and features are also claimed and described.

8 Claims, 10 Drawing Sheets

(56) References Cited

U.S. PATENT DOCUMENTS

| | | | | |
|---|---|---|---|---|
| 3,548,496 | A * | 12/1970 | Van Hook | B26B 13/04 D8/57 |
| 3,972,333 | A | 8/1976 | Leveen | |
| 5,361,498 | A | 11/1994 | Siebenlist | |
| 5,964,033 | A | 10/1999 | Wolf | |
| 2002/0014012 | A1 * | 2/2002 | Hoffman | B26B 29/06 30/294 |
| 2006/0277765 | A1 | 12/2006 | Kaye | |
| 2012/0272531 | A1 | 11/2012 | Jordon et al. | |

OTHER PUBLICATIONS

PCT/US2018/059635. Int'l Search Report & Written Opinion (Mar. 19, 2019).

* cited by examiner

SHEET CUTTER

CLAIM OF PRIORITY

This application is a continuation-in-part of U.S. application Ser. No. 16/762,109, which is the U.S. National Stage of International Patent Application No. PCT/US2018/059635 filed Nov. 7, 2018, which claims priority to and the benefit of U.S. Provisional Application No. 62/583,464 filed in the U.S. Patent and Trademark Office on Nov. 8, 2017, the entire contents of which are incorporated herein by reference as if fully set forth below in their entirety and for all applicable purposes.

BACKGROUND

Field

Various features relate to cutting tools, and more specifically, to sheet cutters.

Background

The cutting of sheet material, such as a sheet of laminate, cardboard, wood, metal, plastic, ceramic, etc., to a desired size may be time consuming and difficult in some scenarios. For example, when a laminate sheet (or other type of sheet material) is to be installed on a kitchen countertop (or other structure), the dimensions of such laminate sheet may exceed the dimensions of the countertop to ensure coverage of the entire surface of the countertop. Accordingly, some portions of the laminate sheet may hang off the edges of the countertop during the installation. These portions of the laminate sheet can be considered excess sheet material and may be cut away once the laminate sheet is affixed to the countertop. However, in these types of scenarios, conventional cutting tools (e.g., shears, scissors, etc.) may not allow a user to achieve a cut that is straight and/or flush with respect to the edge of the countertop.

SUMMARY

In one example, an apparatus is disclosed. The apparatus includes a first arm and a second arm pivotally coupled to the first arm at a hinge. The apparatus further includes a first blade coupled to the first arm. The apparatus further includes a second blade coupled to the second arm. The first arm and second arm are spaced apart to provide a cavity for receiving sheet material to be cut by the first and second blades.

In one example, an apparatus is disclosed. The apparatus includes a first arm including a first planar outer surface. The apparatus further includes a second arm including a second planar outer surface. A first end of the first arm is pivotally coupled to a first end of the second arm. The apparatus further includes a first blade coupled to the first planar outer surface. The apparatus further includes a second blade coupled to the second planar outer surface. The first and second blades are configured to cut into an excess portion of a sheet material extending beyond an outer surface edge of a structure while at least a portion of the first planar outer surface or the second planar outer surface is in contact with the outer surface edge of the structure.

In one example, an apparatus is disclosed. The apparatus includes a first arm including a first planar outer surface. The apparatus further includes a second arm including a second planar outer surface. A first end of the first arm is pivotally coupled to a first end of the second arm. The apparatus further includes a first blade coupled to the first planar outer surface. The apparatus further includes a second blade coupled to the second planar outer surface. The first and second blades are configured to cut a sheet material flush along an outer surface edge of the structure.

DETAILED DESCRIPTION

In the following description, specific details are given to provide a thorough understanding of the various aspects (e.g., embodiments) of the disclosure. However, it will be understood by one of ordinary skill in the art that aspects of the disclosure may be practiced without these specific details. The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Described herein are sheet cutters that may be used to cut sheet material composed of a variety of different materials and that are used for a variety of different purposes. However, for the sake of clarity the following description assumes that the sheet cutters are used to cut laminate sheets. Again however, the sheet cutters' use as laminate sheet cutters are simply one non-limiting, non-exclusive application. It should be understood that the sheet cutters described herein may be used to cut materials other than laminate sheets, such as sheets of cardboard, wood, metal, plastic, ceramic, and other materials. The sheet cutters described herein may cut sheets having a variety of thicknesses. For example, the thickness of a sheet to be cut may be between approximately 0.00001 inches to approximately one inch. The specific type and thickness of the sheet material to be cut may depend on the strength and material composition of the sheet cutters' blades and the sheet cutters' dimensions, which may be different depending on the specific application.

Exemplary Sheet Cutter

Figure 1:
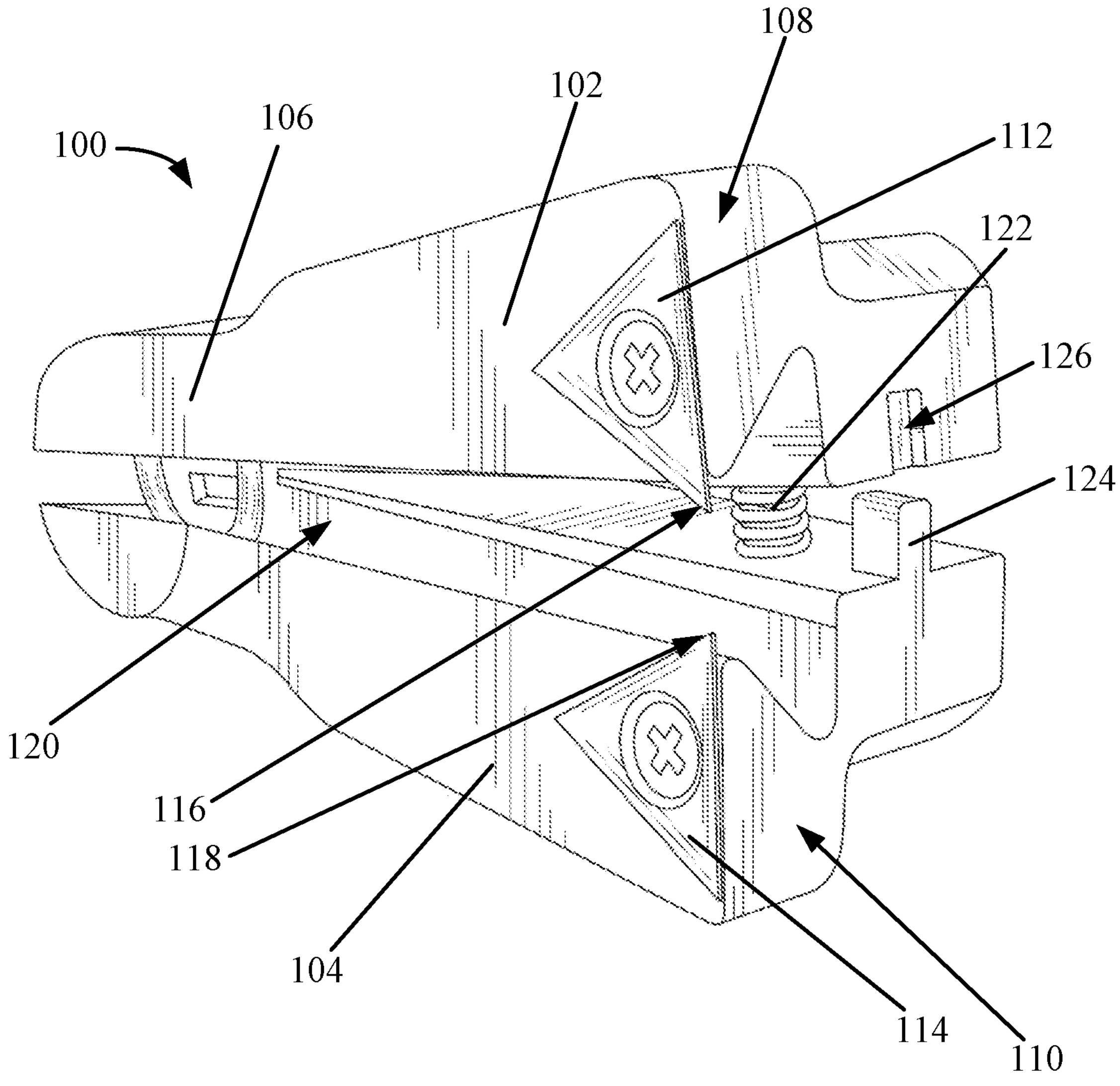
FIG. 1 illustrates a front perspective view of a sheet cutter according to one aspect of the disclosure.
Figure 2:
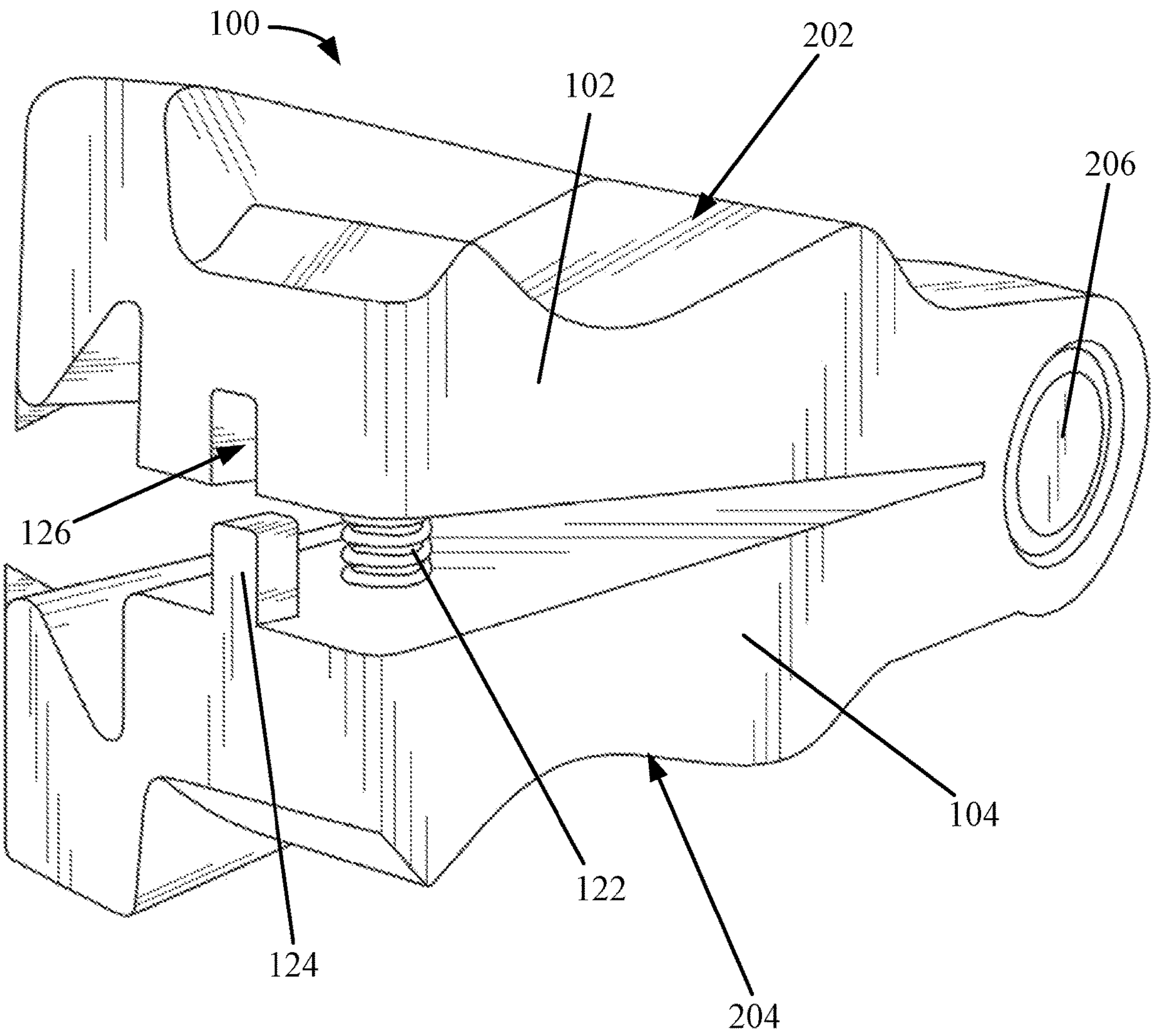
FIG. 2 illustrates a rear perspective view of the sheet cutter according to one aspect of the disclosure.

FIGS. 1 and 2 illustrate a front perspective view and a rear perspective view, respectively, of a sheet cutter 100 according to one aspect of the disclosure.

The sheet cutter 100 may include a first arm 102 and a second arm 104 that are pivotally connected to each other at one end through a hinge 206. The sheet cutter 100 may be small enough so that it can be handheld by a user. In such a case, and as shown in FIG. 2, the top surface 202 of the first arm 102 and the bottom surface 204 of the second arm 104 can be shaped (e.g., contoured) to accommodate a user's hand. In some aspects of the disclosure, the arms 102, 104 may have handles (not shown) coupled to them. In such aspects, the top and bottom surfaces 202, 204 may not be shaped to accommodate a user's hand. In any case, the sheet cutter 100 may be operated by squeezing or otherwise rotating the arms 102, 104 toward each other about the hinge 206 so that the ends 108, 110 of the arms 102, 104 move closer to each other (e.g., see double dashed arrows in FIG. 3).

The sheet cutter 100 further includes two blades 112, 114. The first blade 112 may be positioned/coupled to the first arm 102 near an end 108 (also referred to as a distal end). For example, and as shown in FIGS. 1 and 2, the end 108 of the first arm 102 may be opposite to the end of the first arm 102 that is connected to the hinge 206. The second blade may be positioned/coupled to the second arm 104 near an end 110 (e.g., also referred to as a distal end). For example, the end 110 of the second arm 104 may be opposite to the end of the second arm 104 that is connected to the hinge 206

Each blade 112, 114 includes a sharpened edge and/or point 116, 118 that generally oppose one another (e.g., face each other). As the arms 102, 104 are clamped down toward each other about the pivot point 106, the blades' sharpened edges and/or points 116, 118 also move toward each other and meet. For example, a user may squeeze the arms 102, 104 together with her hand to clamp down the arms 102, 104. As explained in greater detail below, sheet material placed between these blades 112, 114 will be cut.

The sheet cutter 100 further includes a space/cavity 120 between the arms 102, 104 for receiving the sheet material to be cut. A spring 122 may be positioned between the arms 102, 104 to provide a force to keep the arms 102, 104 separated (e.g., also referred to as an "open state" of the sheet cutter 100) until they are squeezed together during cutting (e.g., also referred to as a "closed state" or a "clamped state" of the sheet cutter 100).

As shown in FIGS. 1 and 2, the sheet cutter 100 may further include a stabilizer tab 124 that helps keep the arms 102, 104 and their attached blades 112, 114 properly aligned when the sheet cutter 100 is in a closed state and is cutting material. Otherwise the arms 102, 104 may undesirably move in an axial direction (e.g., as indicated with the lateral dashed arrows in FIG. 3) while cutting which may result in an uneven cut. The stabilizer tab 124 may enter and reside within a corresponding tab cavity 126 when the sheet cutter 100 is placed in the closed state.

Figure 3:
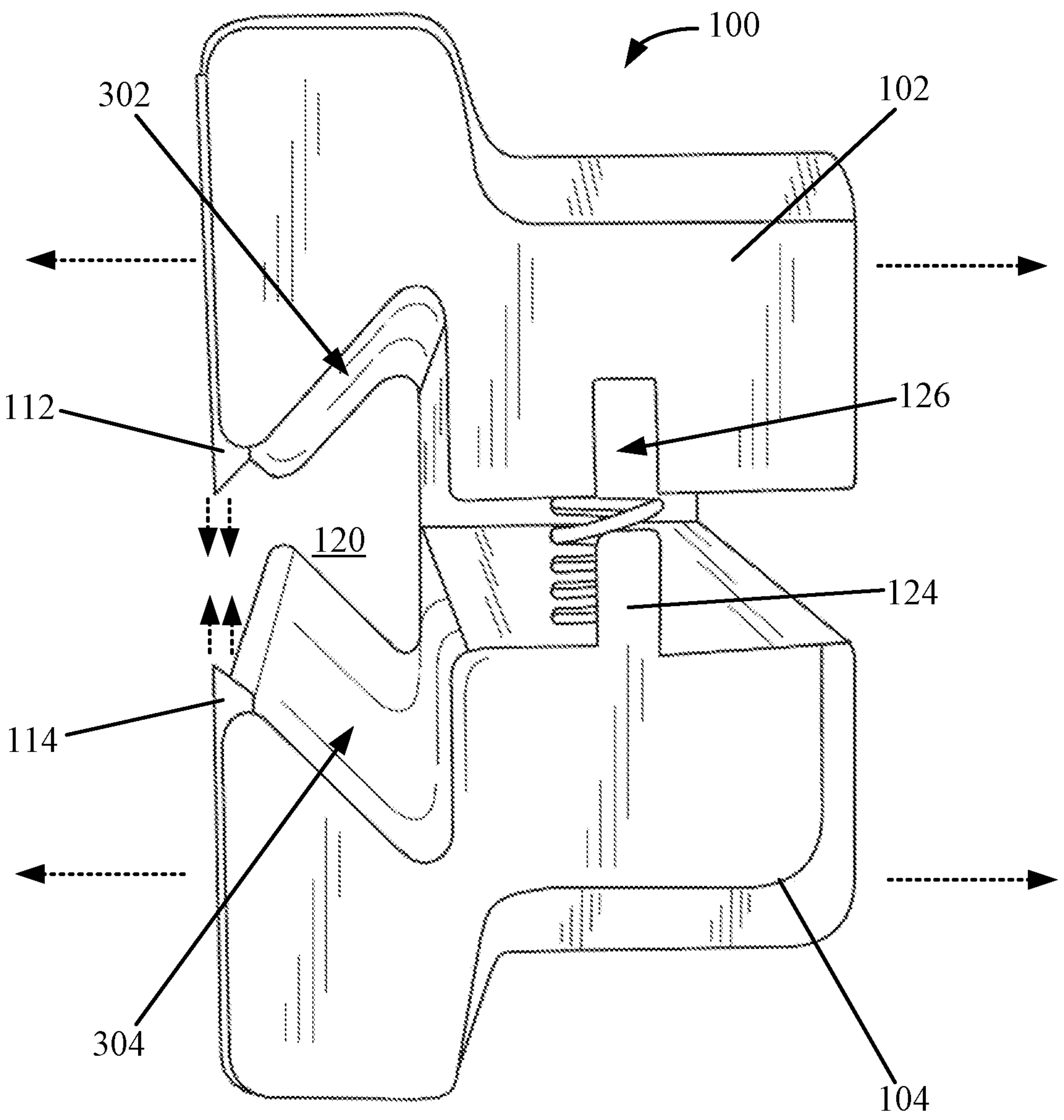
FIG. 3 illustrates a front-side view of the distal end of the sheet cutter according to one aspect of the disclosure.

FIG. 3 illustrates a front-side view of the distal end of the sheet cutter 100 according to one aspect of the disclosure. The material receiving cavity 120 is a space between the arms 102, 104 that receives sheet material to be cut by the blades 112, 114 of the sheet cutter 100. According to one aspect, the receiving cavity 120 has inwardly sloping side surfaces 302, 304 that increase the volume of the receiving cavity 120. In particular, these side surfaces 302, 304 allow sheet material placed within the cavity 120 to be placed at an angle (described in greater detail with respect to FIGS. 7 and 8).

Figure 4:
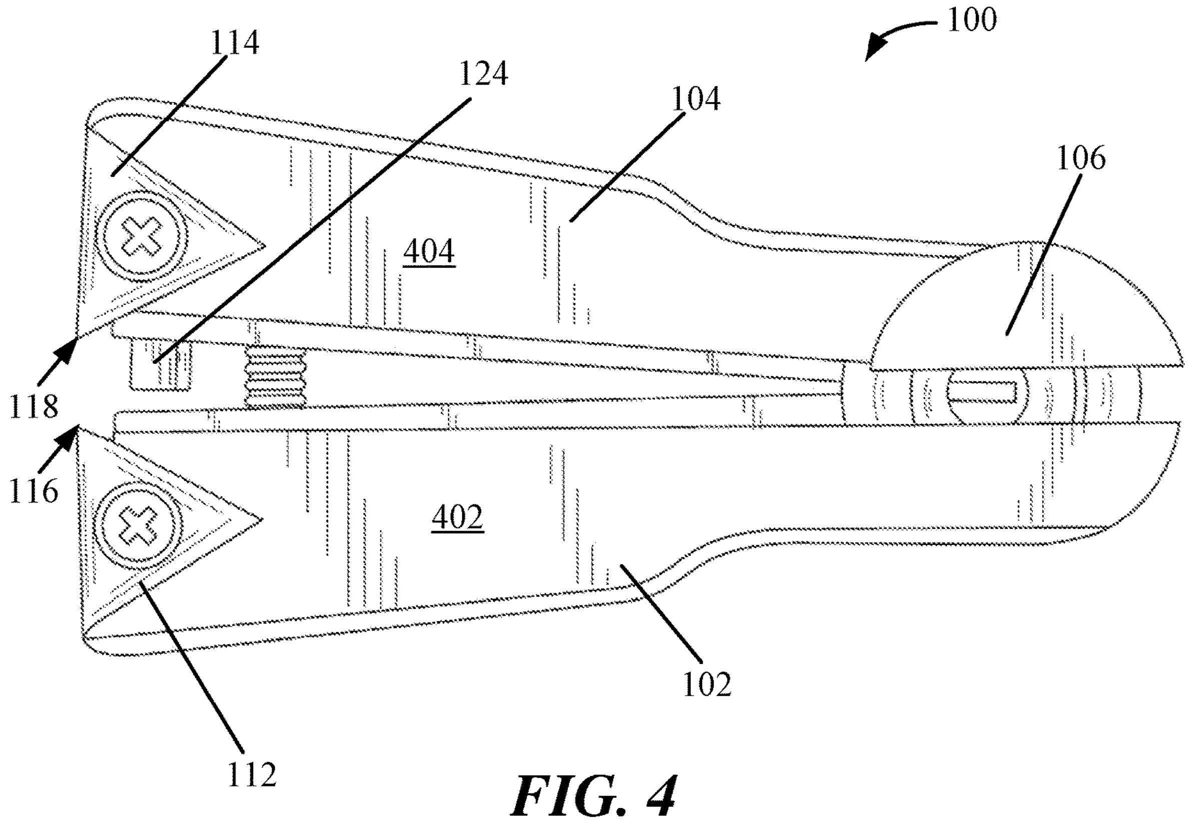
FIG. 4 illustrates a left-side view of the sheet cutter according to one aspect of the disclosure.

FIG. 4 illustrates a left-side view of the sheet cutter 100 according to one aspect of the disclosure. The left-side of the sheet cutter 100 includes the blades 112, 114. The first arm 102 includes an outer surface 402 that may be relatively flat. Accordingly, in some aspects of the disclosure, the outer surface 402 may be a planar outer surface. Similarly, the second arm 104 includes an outer surface 404 that may be relatively flat. Accordingly, in some aspects of the disclosure, the outer surface 404 may be a planar outer surface.

Figure 5:
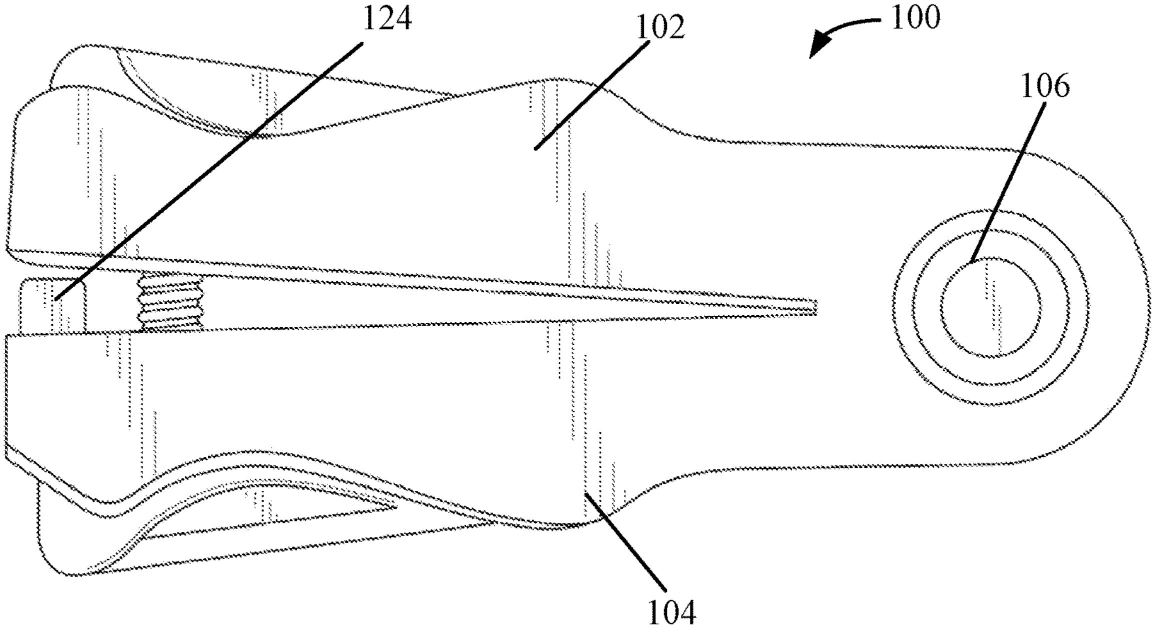
FIG. 5 illustrates a right-side view of the sheet cutter according to one aspect of the disclosure.

FIG. 5 illustrates a right-side view of the sheet cutter 100 according to one aspect of the disclosure. For example, FIG. 5 shows the arms 102, 104, the stabilizer tab 124, and the pivot point 106 of the sheet cutter 100.

Figure 6A:
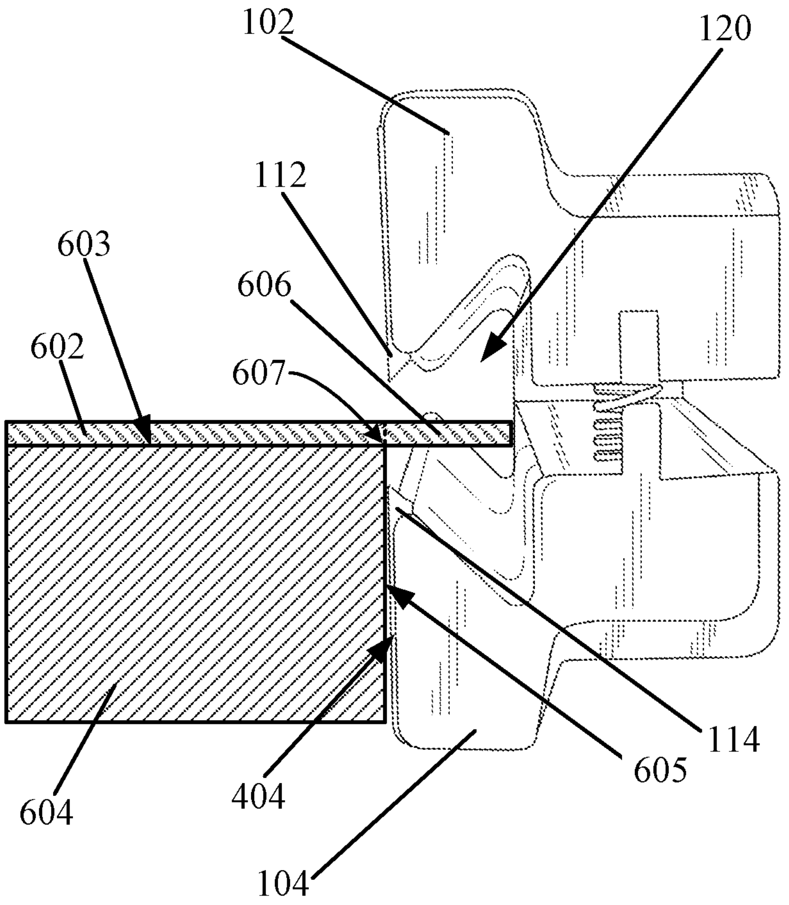
FIG. 6A illustrates the sheet cutter positioned to cut excess sheet material at a right angle according to one aspect of the disclosure.

FIG. 6A illustrates the sheet cutter 100 positioned to cut excess sheet material at a right angle according to one aspect of the disclosure. In the example shown, sheet material 602 may have been affixed (e.g., glued, nailed, etc.) to a surface of a structure 604 (e.g., table, cabinet, wall, countertop, etc.). As one non-limiting, non-exclusive example, the structure 604 may be a cabinet and the sheet material 602 may be laminate sheet material affixed/applied to the top surface 603 of the cabinet. Very often, the dimensions of the sheet material 602 being applied may not achieve a perfect fit to cover the top surface 603 and excess sheet material 606 may hang off of the edge of the top surface 603. The sheet cutter 100 described herein may be used to cut away this excess sheet material 606. In particular, the sheet cutter 100 may be used to remove the entire excess sheet material 606 even if the excess sheet material 606 is adjacent to a wall or other surface.

As shown in FIG. 6A, to cut away the excess sheet material 606, the sheet cutter 100 is fitted over the excess sheet material 606. More specifically, the excess sheet material 606 is inserted into the receiving cavity 120 until an outer surface 402, 404 of one of the arms 102, 104 touches (e.g., contacts) an outer surface edge 605 of the structure 604. Since the blades 112, 114 of the sheet cutter 100 are mounted onto the outer surfaces 402, 404 of the arms 102, 104, the blades' sharpened edges/points 116, 118 are aligned to cut the excess sheet material 606 at approximately the same point where the excess sheet material 606 hangs off of the structure's outer surface edge 605. For example, as shown in FIG. 6A, the sheet cutter 100 enables the blades 112, 114 to be brought as close as possible to the point 607 where the excess sheet material 606 begins to extend beyond the top surface 603 of the structure 604. The arms 102, 104 may then be squeezed together into the closed state, which in turn presses the blades' sharpened edges/points 116, 118 into the excess sheet material 606. Pulling the sheet cutter 100 along the outer surface edge 605 of the structure while keeping the sheet cutter 100 in the closed state causes the blades 112, 114 to cut off all the excess sheet material 606.

If the outer surface edge 605 of the structure having the excess sheet material 606 dangling off is flat, then the outer surface edge 605 will rest flush against the outer surface 402, 404 of the sheet cutter 100 to help provide a more even, straight cut. As shown in FIG. 6A, for example, the blades 112, 114 may cut into the excess sheet material 606 extending beyond the outer surface edge 605 of the structure 604 while at least a portion of the outer surface 404 of the arm 104 is in contact with the outer surface edge 605 of the structure 604. As also shown in FIG. 6A, the first and second blades 112, 114 are configured to enable cutting of the sheet material 602 (e.g., to remove the excess sheet material 606) flush along the outer surface edge 605 of the structure 604. For example, referring to FIG. 6B, the resulting cut surface 608 is at a right angle and flush with respect to the structure's outer surface edge 605.

Referring to FIGS. 4 and 6A, according to one aspect, the blades' sharpened edge/points 116, 118 may be positioned at the very end (distal end) of the arms 102, 104. Such a design may enable the sheet cutter 100 to cut off excess sheet material 606 residing close to a wall (not shown) or other surface that would otherwise prevent the blades 112, 114 from accessing such excess sheet material 606.

Figure 6B:
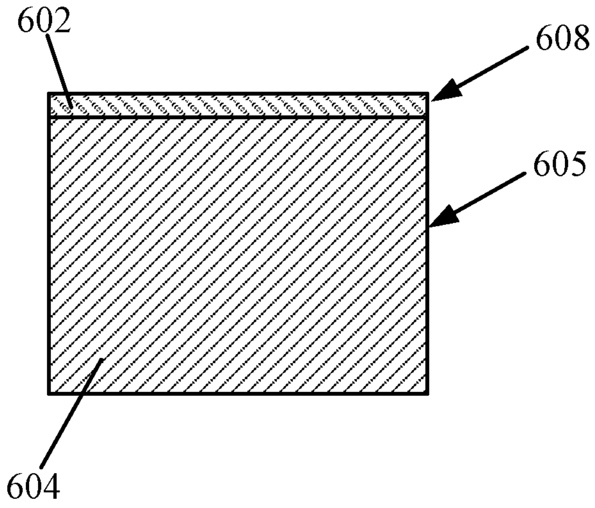
FIG. 6B illustrates a resulting cut surface that is at a right angle and flush with respect to a structure's outer surface edge.

In the example shown in FIGS. 6A and 6B, the outer surface 404 of the sheet cutter's second arm 104 is shown to be pressed against the outer surface edge 605 of the structure 604. However, since the sheet cutter 100 is symmetrical, the sheet cutter 100 may be flipped around so that the outer surface 402 of the sheet cutter's first arm 102 is pressed against the outer surface edge 605 of the structure 604. In this configuration, the sheet cutter 100 may be pulled in the opposite direction relative to the configuration shown in FIG. 6A to make the cut.

Figure 7A:
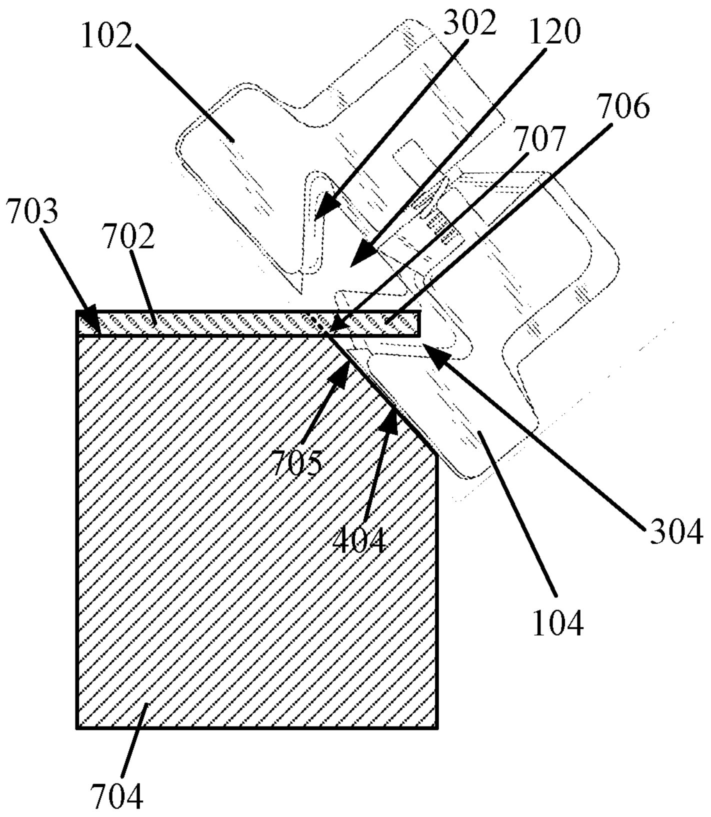
FIG. 7A illustrates the sheet cutter positioned to cut excess sheet material at an acute angle according to one aspect of the disclosure.

FIG. 7A illustrates the sheet cutter 100 positioned to cut excess sheet material 706 at an acute angle according to one aspect of the disclosure. In the example shown in FIG. 7A, sheet material 702 (e.g., laminate sheet material or other sheet material) may have been affixed (e.g., glued, nailed, etc.) to a top surface 703 of a structure 704 (e.g., table, cabinet, wall, countertop, etc.). In the event that the outer surface edge 705 of the structure 704 is at an acute angle with respect to the excess sheet material 706 hanging off, the excess sheet material 706 is inserted into the sheet cutter's receiving cavity 120 and an outer surface 402, 404 of one of the sheet cutter's arms 102, 104 is pressed against the outer surface edge 705 of the structure 704. This brings the blades 112, 114 as close as possible to the point 707 where the excess sheet material 706 begins to hang off (e.g., begins to extend beyond) the structure's top surface 703.

Referring to FIGS. 3 and 7A, the angled interior surfaces 302, 304 of the receiving cavity 120 allow additional room for the excess sheet material 706 to reside within the cavity 120. In the example shown in FIG. 7A, the outer surface 404 of the second arm 104 presses against the outer surface edge 705 of the structure 704 and the excess sheet material 706 extends into and resides close to the inward sloping surface 304 of the second arm 104. If, however, the sheet cutter 100 was flipped in its orientation then the outer surface 402 of the first arm 102 would press against the outer surface edge 705 of the structure 704 and the excess sheet material 706 would extend into and reside close to the inward sloping surface 302 of the first arm 102.

Once the excess sheet material 706 resides in the cavity 120 and the blades 112, 114 are in position over the cutting point (e.g., the second arm's outer surface 404 or the first arm's outer surface 402 presses against the outer surface edge 705 of the structure 704), the arms 102, 104 of the sheet cutter 100 may be squeezed together (e.g., the sheet cutter 100 enters the closed state) so that the blades' sharpened edges/points 116, 118 cut down into the excess sheet material 706. Pulling the sheet cutter 100 along the outer surface edge 705 of the structure 704 while keeping the sheet cutter 100 in the closed state causes the blades 112, 114 to cut off all the excess sheet material 706. If the outer surface edge 705 of the structure 704 is flat, then the outer surface edge 705 will rest flush against the sheet cutter's outer surface 402, 404 to help provide a more even, straight cut.

Figure 7B:
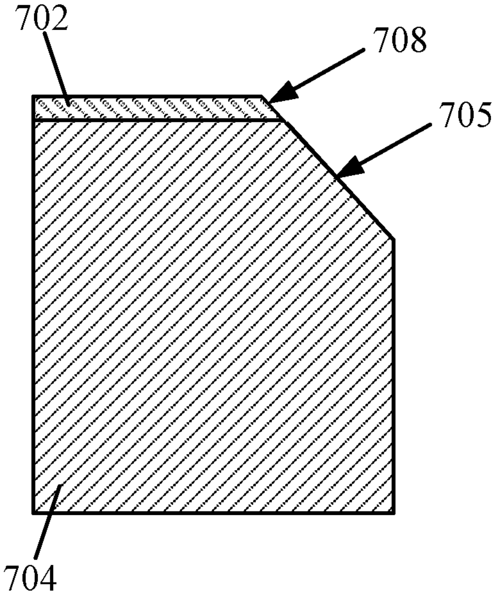
FIG. 7B illustrates a resulting cut surface that is at an acute angle and flush with respect to a structure's outer surface edge.

FIG. 7B illustrates the resulting cut surface 708 that is at an acute angle and flush with respect to the outer surface edge 705 of the structure 704.

Figure 8A:
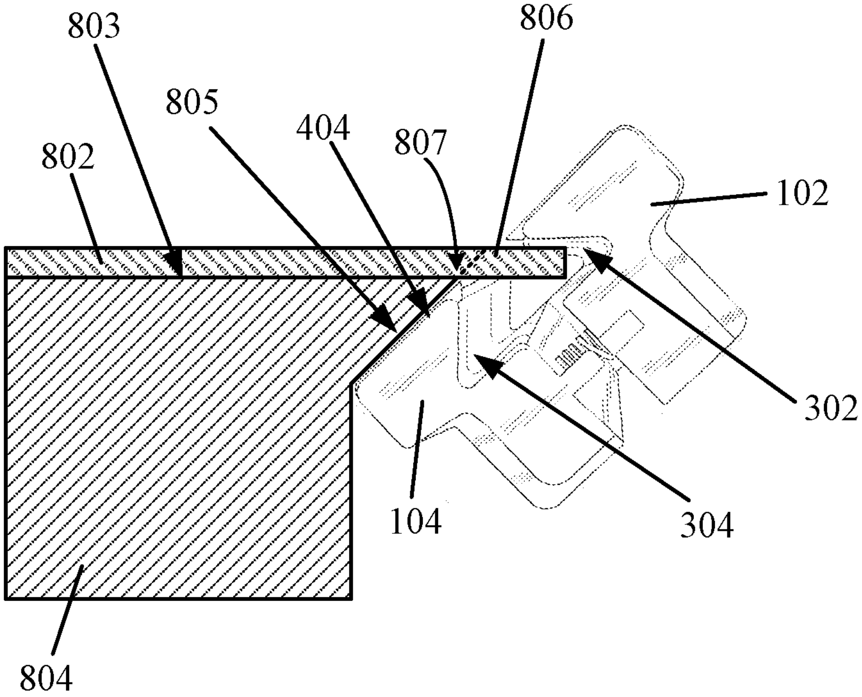
FIG. 8A illustrates the sheet cutter positioned to cut excess sheet material at an obtuse angle according to one aspect of the disclosure.

FIG. 8A illustrates the sheet cutter 100 positioned to cut excess sheet material 806 at an obtuse angle according to one aspect of the disclosure. In the example shown in FIG. 8A, sheet material 802 (e.g., laminate sheet material or other sheet material) may have been affixed (e.g., glued, nailed, etc.) to a top surface 803 of a structure 804 (e.g., table, cabinet, wall, countertop, etc.). As shown in FIG. 8A, in the event that the outer surface edge 805 of the structure 804 is at an obtuse angle with respect to the excess sheet material 806 hanging off, the excess sheet material 806 may be inserted into the receiving cavity 120 of the sheet cutter 100. As further shown in FIG. 8A, the outer surface 404 of the sheet cutter's arm 104 (or the outer surface 402 of the sheet cutter's arm 102) may be pressed against the structure's outer surface edge 805. This brings the blades 112, 114 as close as possible to the point 807 where the excess sheet material 806 begins to hang off (e.g., begins to extend beyond) the structure's top surface 803.

Referring to FIGS. 3 and 8A, the angled interior surfaces 302, 304 of the receiving cavity 120 allow additional room for the excess sheet material 806 to reside within the cavity 120. In the example shown in FIG. 8A, the outer surface 404 of the second arm 104 presses against the outer surface edge 805 of the structure 804 and the excess sheet material 806 extends into and resides close to the inward sloping surface 302 of the first arm 102. If, however, the sheet cutter 100 was flipped in its orientation then the first arm's outer surface 402 would press against the outer surface edge 805 of the structure 804 and the excess sheet material 806 would extend into and reside close to the inward sloping surface 304 of the second arm 104.

Once the excess material 806 resides in the cavity 120 and the blades 112, 114 are in position over the cutting point (e.g., the second arm's outer surface 404 or the first arm's outer surface 402 presses against the outer surface edge 805 of the structure 804), the arms 102, 104 of the sheet cutter 100 may be squeezed together (e.g., the sheet cutter 100 enters the closed state) so that the blades' sharpened edges/points 116, 118 cut down into the excess sheet material 806. Pulling the sheet cutter 100 along the outer surface edge 805 of the structure 804 while keeping the sheet cutter 100 in the closed state causes the blades 112, 114 to cut off all the excess sheet material 806. If the outer surface edge 805 of the structure 804 is flat, then the outer surface edge 805 will rest flush against the sheet cutter's outer surface 402, 404 to help provide a more even, straight cut.

Figure 8B:
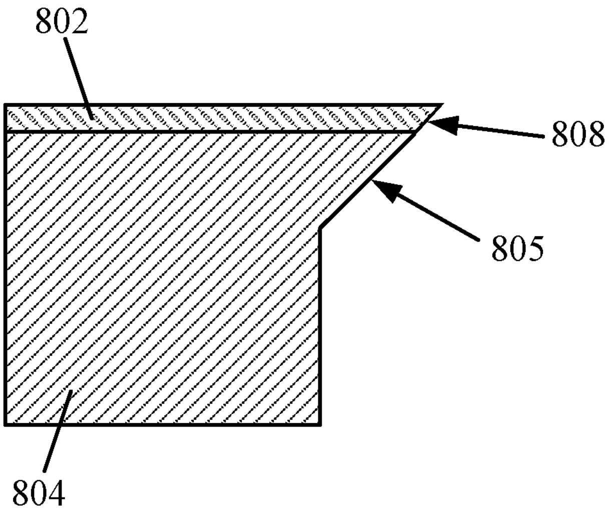
FIG. 8B illustrates a resulting cut surface that is at an obtuse angle and flush with respect to a structure's outer surface edge.

FIG. 8B illustrates the resulting cut surface 808 that is at an obtuse angle and flush with respect to the structure's outer surface edge 805.

Figure 9A:
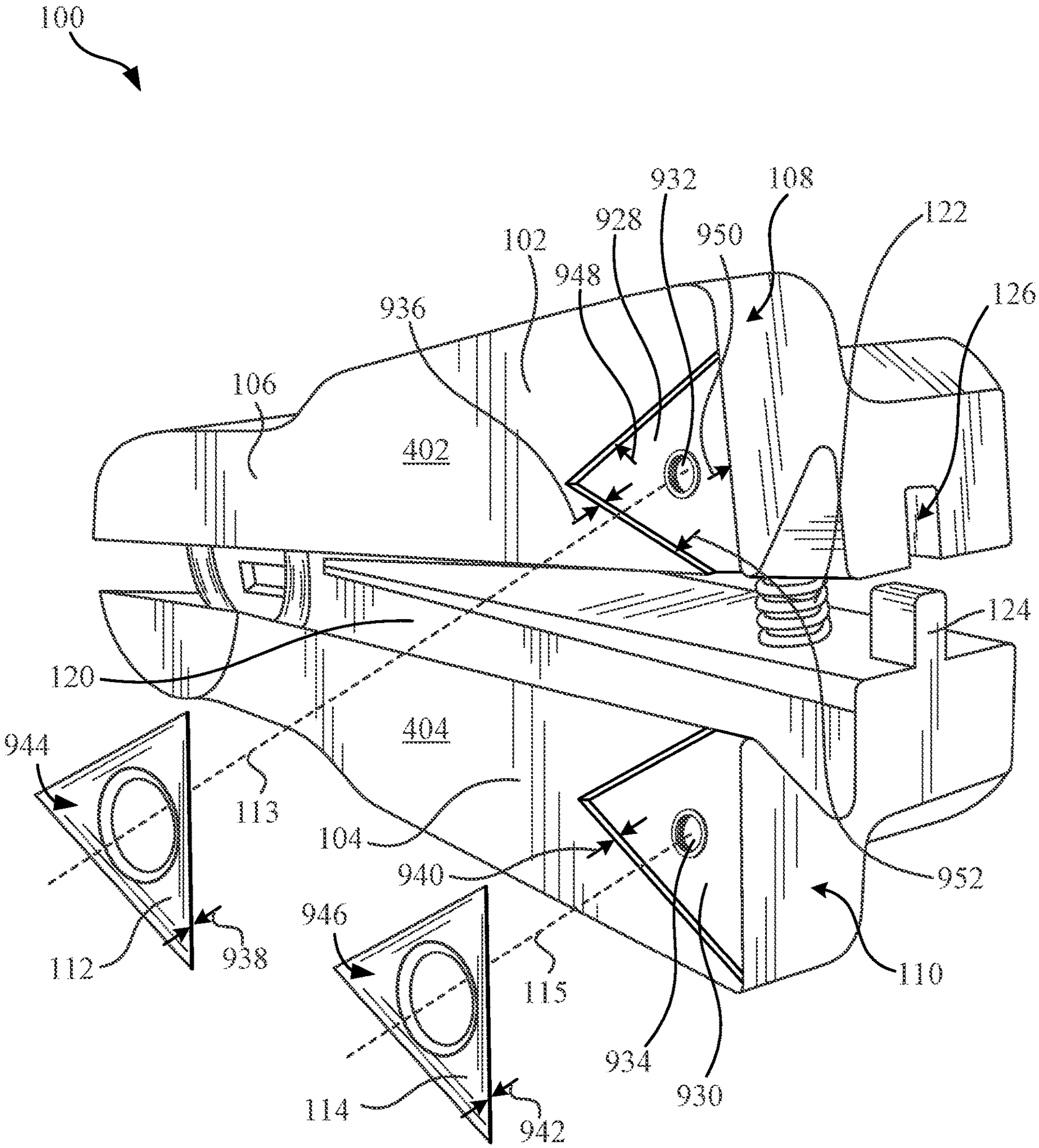
FIG. 9A illustrates a front perspective view of a sheet cutter according to one aspect of the disclosure.

FIG. 9A illustrates a front perspective view of the sheet cutter 100 according to one aspect of the disclosure.

As shown in FIG. 9A, the sheet cutter 100 may include a first recessed region 928 in the first arm 102 and a second recessed region 930 in the second arm 104. The first recessed region 928 may be shaped to accommodate the first blade 112 and the second recessed region 930 may be shaped to accommodate the second blade 114. A first hole 932 may be provided in the first recessed region 928 and a second hole 934 may be provided in the second recessed region 930. For example, each of first and second holes 932, 934 may be threaded to accommodate a screw.

In some examples, the first and second recessed regions 928, 930 may each have a depth based on a thickness of a blade. For example, the first recessed region 928 may have a depth 936 that is equal to a thickness 938 of the first blade 112, and the second recessed region 930 may have a depth 940 that is equal to a thickness 942 of the second blade 114. Therefore, when the first blade 112 is situated in the first recessed region 928 (e.g., following the dashed line 113), an outer surface 944 of the first blade 112 may be flush with the outer surface 402 of the first arm 102. Furthermore, when the second blade 114 is situated in the second recessed region 930 (e.g., following the dashed line 115), an outer surface 946 of the second blade 114 may be flush with the outer surface 404 of the second arm 104. This is illustrated in FIG. 9B.

Figure 9B:
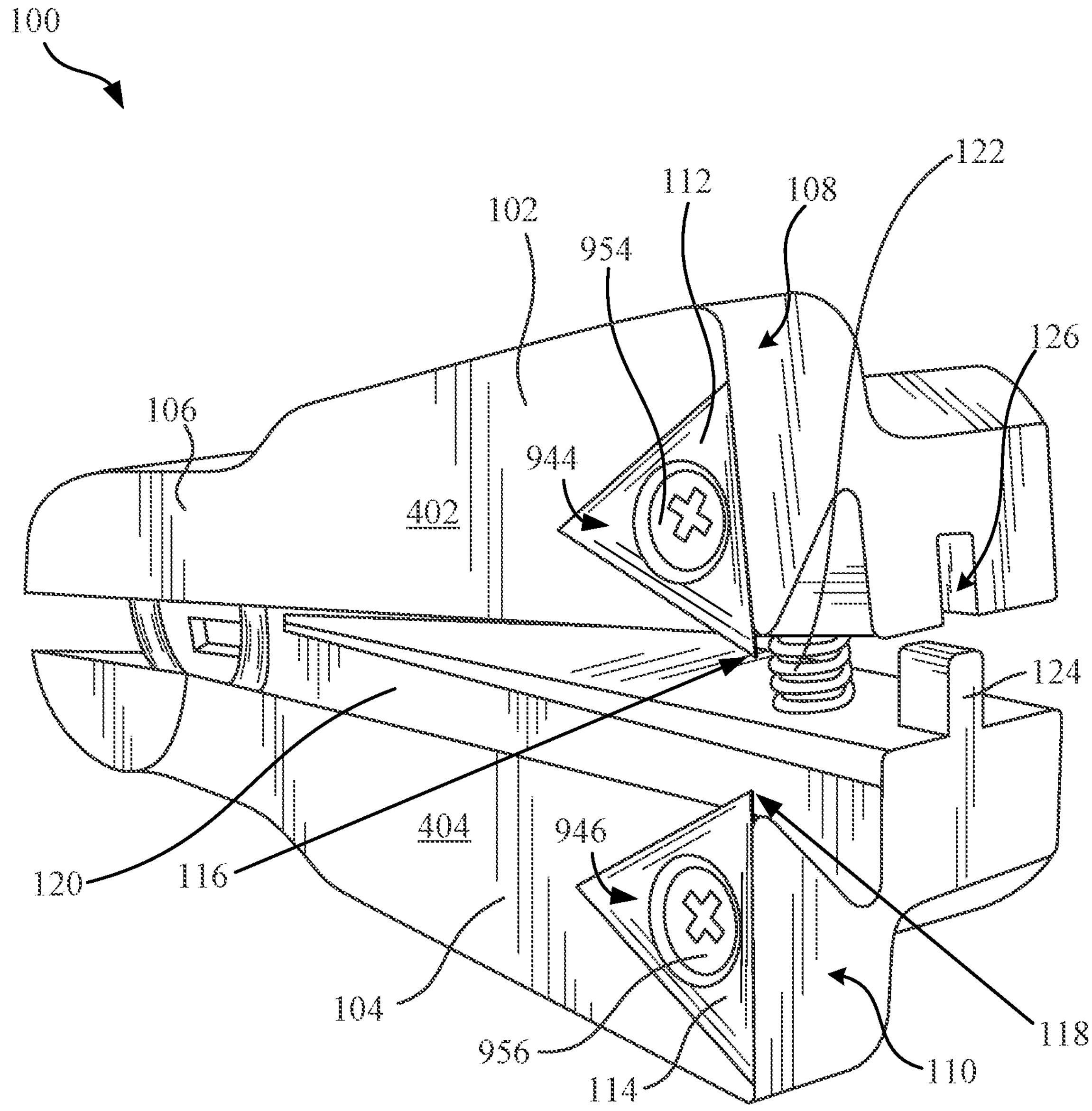
FIG. 9B illustrates a front perspective view of the sheet cutter after a first blade has been situated in a first recessed region and a second blade has been situated in a second recessed region according to one aspect of the disclosure.

FIG. 9B illustrates a front perspective view of the sheet cutter 100 after the first blade 112 has been situated in the first recessed region 928 and the second blade 114 has been situated in the second recessed region 930 according to one aspect of the disclosure. In FIG. 9B, the first blade 112 may be secured to the first arm 102 using a first screw 954 and the second blade 114 may be secured to the second arm 104 using a second screw 956. In FIG. 9B, it should be understood that the outer surface 944 of the first blade 112 is flush with the outer surface 402 of the first arm 102, and the outer surface 946 of the second blade 114 is flush with the outer surface 404 of the second arm 104. Therefore, it may be said that the outer surface 944 of the first blade 112 and the outer surface 402 of the first arm 102 are on a same plane. It may further be said that the outer surface 946 of the second blade 114 and the outer surface 404 of the second arm 104 are on a same plane. In some examples, the outer surface 944 of the first blade 112, the outer surface 946 of the second blade 114, the outer surface 402 of the first arm 102, and the outer surface 404 of the second arm 104 may all be on a same plane.

Figure 9C:
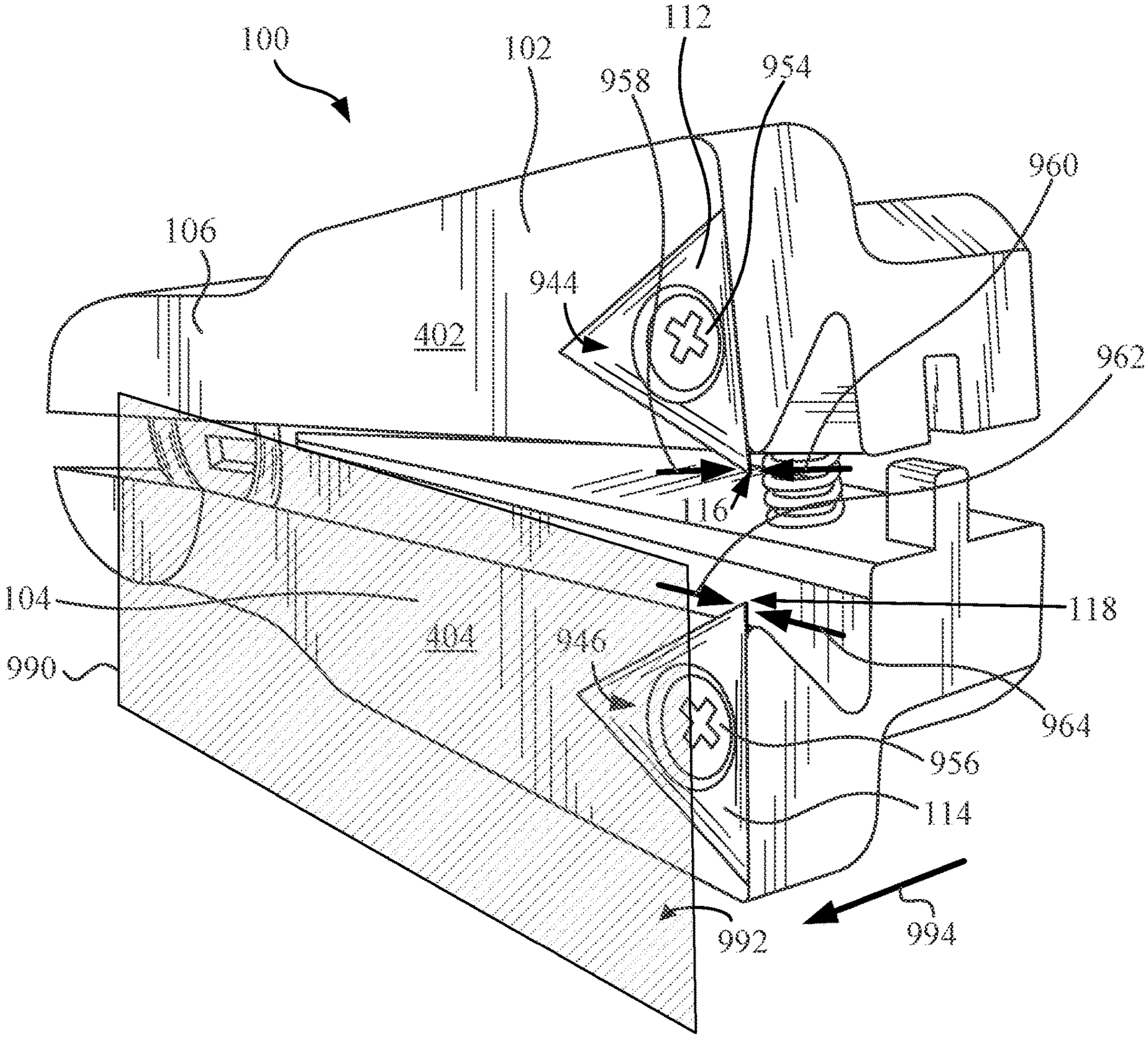
FIG. 9C illustrates a front perspective view of the sheet cutter after the first blade has been situated in the first recessed region and the second blade has been situated in the second recessed region according to one aspect of the disclosure.

Since the outer surface 946 of the second blade 114 is flush with the outer surface 404 of the second arm 104 in the aspect of FIG. 9B, the second blade 114 and the outer surface 404 of the second arm 104 may both rest flush along an outer surface edge (e.g., a planar outer surface edge) of a structure. This is illustrated in FIG. 9C. FIG. 9C illustrates a front perspective view of the sheet cutter 100 after the first blade 112 has been situated in the first recessed region 928 and the second blade 114 has been situated in the second recessed region 930 according to one aspect of the disclosure. In FIG. 9C, as the sheet cutter 100 is moved in a direction 994 toward an outer surface edge 992 (e.g., a planar outer surface edge) of a structure 990 (e.g., a wall, a cabinet face, etc.), the outer surface 946 of the second blade 114 and the outer surface 404 of the second arm 104 may both rest flush on the outer surface edge 992 of the structure 990.

In some examples, the structure 990 may correspond to the structure 604 of FIG. 6A and the outer surface edge 992 may correspond to the outer surface edge 605 of FIG. 6A. Therefore, in these examples, both the outer surface 946 of second blade 114 and the outer surface 404 of the second arm 104 may contact the outer surface edge 605 to enable cutting of the sheet material 602 (e.g., to remove the excess sheet material 606) flush along the outer surface edge 605 of the structure 604. Therefore, the aspects of FIGS. 9A, 9B, 9C may allow the second blade 114 to be brought as close as possible to the outer surface edge 605 (e.g., the outer surface 946 of the second blade 114 may make contact with the outer surface edge 605) when the outer surface 404 of the sheet cutter's second arm 104 is pressed against the outer surface edge 605 of the structure 604.

In some aspects, a shape of the first recessed region 928 may prevent the first blade 112 from rotating when a force is applied to the sharpened edge and/or point 116, and a shape of the second recessed region 930 may prevent the second blade 114 from rotating when a force is applied to the sharpened edge and/or point 118. For example, with reference to FIGS. 9A and 9C, a first sidewall 948, a second sidewall 950, and a third sidewall 952 of the first recessed region 928 corresponding to the shape of the first blade 112 may prevent the first blade 112 from rotating about the first screw 954 when a force (e.g., a first force 958 or a second force 960) is applied to the sharpened edge and/or point 116. Likewise, sidewalls of the second recessed region 930 corresponding to the shape of the second blade 114 may prevent the second blade 114 from rotating about the second screw 956 when a force (e.g., a first force 962 or a second force 964) is applied to the sharpened edge and/or point 118.

In one example, the previously discussed forces may be applied to the sharpened edges and/or points 116, 118 when a user pulls the sheet cutter 100 along the outer surface edge 605 of the structure while keeping the sheet cutter 100 in the closed state to cause the blades 112, 114 to cut off all the excess sheet material 606. For example, such prevention of the first and second blades 112, 114 from rotating may ensure that the positions of the sharpened edges and/or points 116, 118 do not change to enable proper cutting of any excess sheet material (e.g., the excess sheet material 606).

One or more of the components, steps, features, and/or functions illustrated in FIGS. 1, 2, 3, 4, 5, 6A, 6B, 7A, 7B, 8A, 8B, 9A, 9B, and/or 9C may be rearranged and/or combined into a single component, step, feature or function or embodied in several components, steps, or functions. Additional elements, components, steps, and/or functions may also be added without departing from the invention.

The various features of the invention described herein can be implemented in different ways without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus comprising:

a first arm including a first planar outer surface coupled to a first inwardly sloping side surface;

a hinge;

a second arm, different from the first arm, including a second planar outer surface coupled to a second inwardly sloping side surface, wherein a first end of the first arm is pivotally coupled to a first end of the second arm via the hinge;

a first screw;

a first blade having a first plurality of sharpened edges and points coupled via the first screw to the first arm and received in a first recessed region in the first arm at a second end of the first arm, the first blade including a first blade outer surface;

a second screw;

a second blade having a second plurality of sharpened edges and points coupled via the second screw to the second arm and received in a second recessed region in the second arm at a second end of the second arm, the second blade including a second blade outer surface; and a first cavity defined by the first inwardly sloping side surface and a first interior surface of the first arm, wherein the first interior surface is parallel to the first planar outer surface and spaced apart from the first planar outer surface; the first cavity extends from the second end of the first arm to the first end of the first arm;

a second cavity defined by the second inwardly sloping side surface and a second interior surface of the second arm, wherein the second interior surface is parallel to the second planar outer surface and spaced apart from the second planar outer surface; the second cavity extends from the second end of the second arm to the first end of the second arm;

wherein the first planar outer surface, the first blade outer surface, the second planar outer surface, and the second blade outer surface are coplanar, and the hinge, the first cavity, the second cavity, the first screw, and the second screw are located behind the first planar outer surface, the first blade outer surface, the second planar outer surface, and the second blade outer surface.

2. The apparatus of claim 1, wherein:

at least one of: the first planar outer surface and the first blade outer surface, or the second planar outer surface and the second blade outer surface, is configured to lie parallel to and contact an outer surface edge of a structure; and when lying parallel to and contacting the outer surface edge of the structure, the apparatus is configured to cut a sheet material extending beyond the outer surface edge and behind the first planar outer surface, the first blade outer surface, the second planar outer surface, and the second blade outer surface flush with and along the outer surface edge of the structure.

3. The apparatus of claim 1, wherein a first shape of the first recessed region prevents rotation of the first blade, and wherein a second shape of the second recessed region prevents rotation of the second blade.

4. The apparatus of claim 1, wherein the first and second planar outer surfaces are both located on a same side of the apparatus.

5. The apparatus of claim 1, wherein the first blade is at the second end of the first arm, distal from the first end of the first arm, and the second blade is at the second end of the second arm, distal from the first end of the second arm.

6. The apparatus of claim 1, further comprising:

a stabilizer tab; and a stabilizer tab cavity that is configured to receive the stabilizer tab, wherein the stabilizer tab, once received in the stabilizer tab cavity, is configured to maintain a coplanar alignment of the first blade and the second blade when the first and second arms are clamped together.

7. The apparatus of claim 1, wherein at least a portion of a top surface of the first arm and at least a portion of a bottom surface of the second arm are configured to accommodate a hand of a user.

8. The apparatus of claim 1, wherein entireties of the first planar outer surface, the first blade outer surface, the second planar outer surface, and the second blade outer surface are coplanar.

* * * * *